Patented Feb. 27, 1940

2,191,575

UNITED STATES PATENT OFFICE 2,191,575

PAPER FILLER AND METHOD OF MAKING THE SAME

Howard D. Meincke, Glencoe, Ill.

No Drawing. Application June 23, 1938, Serial No. 215,502

6 Claims. (Cl. 134—18)

This invention relates to a paper filler and a method of preparing the same.

One of the great problems in connection with paper fillers is the loss of the filler in the processing of the pulp after the filler has been added. The retention of many suitable fillers is so low as to make their use impracticable. By means of the present invention the retention of common filling materials is remarkably increased.

In accordance with the present invention a gypsum cement, preferably a quick-setting cement, is agitated with water and with a substantial proportion of a non-cementitious filling material. The agitation is continued until the gypsum has passed through its setting period, after which the wet material may be added to the paper pulp or it may be dried and used in its dry condition.

The proportion of water to gypsum is ordinarily about 10 to 1 and the ratio of gypsum to other filler may be varied considerably. It is preferred to add at least 10%, and usually at least 25% of the non-setting filler, and this amount may be increased very much. For example, 25 parts of gypsum and 75 parts of a filler such as barium sulfate, calcium carbonate, titanium dioxide, or zinc sulfide gives quite satisfactory results.

During the agitation through the set the gypsum crystals are transformed into long needle-like masses which interlock and mat, causing the gypsum to bulk up very greatly. Just why this should increase the retention of the other materials is not understood, however.

A hydrated gypsum which has been heated to a temperature of approximately 260° F. to 300° F., and preferably between 270° F. and 290° F., appears to produce a cement best suited to such use. Gypsum burned in this range will, in general, have a moisture content of 6% to 11½%, preferably from 8% to 10%.

A cement produced at 270° F. and having a moisture content of 9% will have a setting period of only one or two minutes. A gypsum cement having a setting period of less than five minutes is preferred.

The hydrated gypsum may be raw gypsum or any gypsum having a water content above that desired in the final product. Cements heated to a temperature below 270° F. to 280° F. in general tend to set more rapidly and those heated to about 300° F. tend to set more slowly. A too rapidly setting cement is difficult to handle. Those which set too slowly do not appear to increase the retention to the same extent. If it is desired to use a slow acting cement, the setting period may be accelerated by the use of well-known accelerators, such as acid potassium sulfate. Likewise, a cement having too rapid a setting period may be slowed down by the use of well-known retarders, such as glue, vegetable juices, or the like. A quickly setting cement may be carefully sifted into water to avoid the formation of lumps. The addition of a minor proportion of alum, say ½% to 1%, before or during agitation acts as an individual bulking agent, is a desirable feature.

Any suitable filler may be incorporated in this manner. Barium sulfate, the various forms of calcium carbonate, titanium dioxide and zinc sulfide are the fillers preferred. The titanium dioxide may be pure or in the cheaper grade such as titanox C. Various mixtures of pigments may likewise be added.

Where desired, non-setting or dead-burned gypsum may be incorporated as a filler. Other inert fillers such as clay, lithopone, and the like may also be employed with the gypsum.

The foregoing detailed description is given for clearness of understanding only, and no unnecessary limitations should be understood therefrom, but the appended claims should be construed as broadly as permissible in view of the prior art.

I claim:

1. The method of increasing the retention of a non-setting paper filler, which comprises agitating a gypsum cement in water in the presence of a substantial proportion of a non-setting filler until the gypsum cement has passed through its setting period.

2. The method as set forth in claim 1, in which the proportion of inert filler is from approximately 25% to 75% of the total of filler and gypsum cement.

3. The method as set forth in claim 1, in which the fillers are of the class consisting of barium sulfate, calcium carbonate, clay and titanium dioxide.

4. The method as set forth in claim 1, in which the gypsum cement has a setting period of less than five minutes.

5. A dry composition consisting essentially of 25% to 75% of gypsum in the form of long needle-like interlocking crystals and 75% to 25% of a non-setting filler interlocked with the gypsum crystals.

6. The product as set forth in claim 5, in which the filler is material of the class consisting of barium sulfate, calcium carbonate, clay, titanium dioxide and zinc sulfide.

HOWARD D. MEINCKE.